United States Patent [19]
Petty

[11] 3,831,441
[45] Aug. 27, 1974

[54] LOAD CELL
[75] Inventor: Johnny M. Petty, Warren, Mich.
[73] Assignee: Ford Motor Company, Dearborn, Mich.
[22] Filed: Mar. 2, 1973
[21] Appl. No.: 337,515

[52] U.S. Cl. ................... 73/141 A, 73/11, 177/211
[51] Int. Cl. ............................................. G01l 5/00
[58] Field of Search ............... 73/141 A, 141 R, 11; 177/211

[56] References Cited
UNITED STATES PATENTS
| | | | |
|---|---|---|---|
| 3,520,183 | 7/1970 | Krizik | 73/141 A |
| 3,618,376 | 11/1971 | Shull et al. | 73/141 A |
| 3,696,317 | 10/1972 | Farr | 73/141 A |

*Primary Examiner*—James J. Gill
*Assistant Examiner*—Anthony V. Ciarlante
*Attorney, Agent, or Firm*—Keith L. Zerschling; John J. Roethel

[57] ABSTRACT

A load cell insensitive to bending loads and able to accurately indicate off-center loading for tension or compression loads under static or dynamic conditions. The load cell comprises a plurality of strain gaged beams, the beams being selected to have substantially identical stress versus strain curves. The beams are supported in a simple arrangement and are effective to indicate desired load and to cancel out the effects of undesirable loads.

12 Claims, 7 Drawing Figures

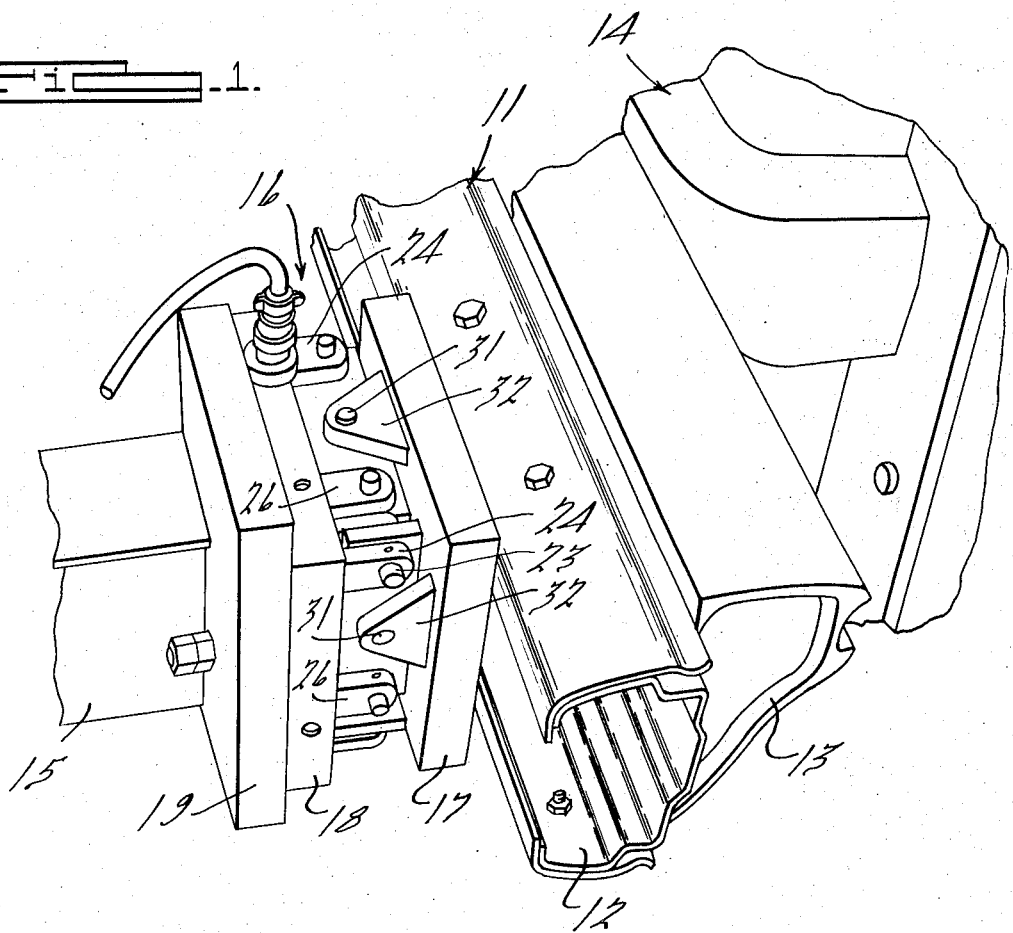
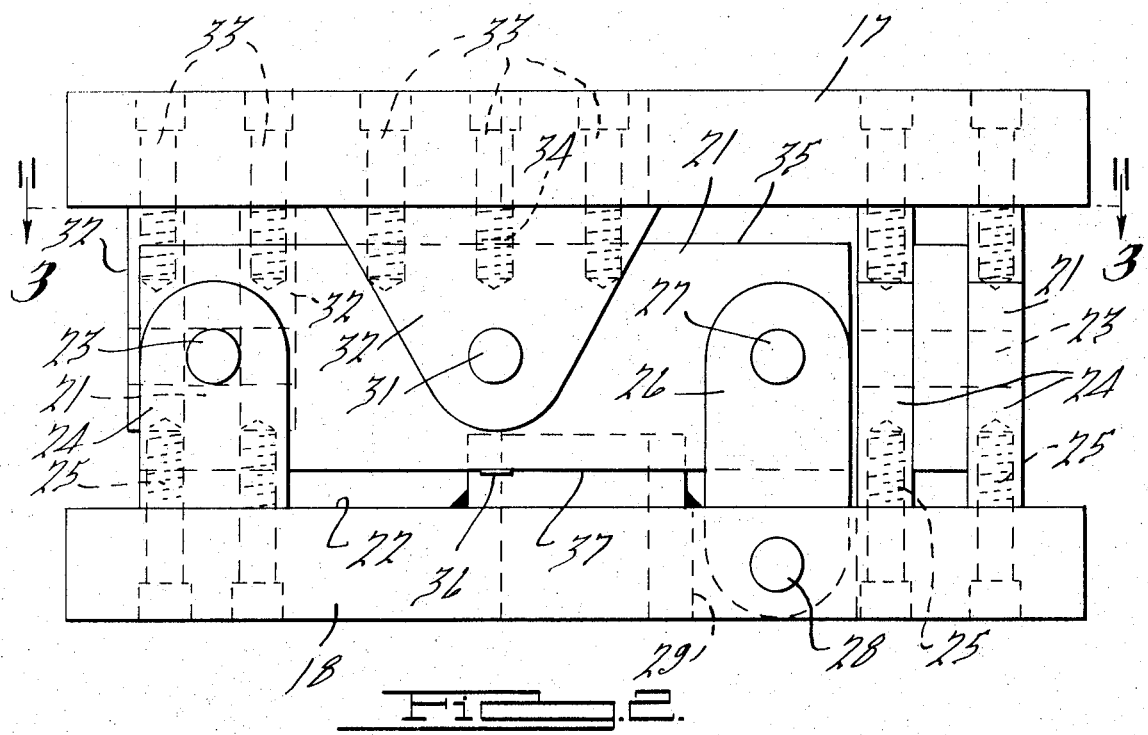

LOAD CELL

BACKGROUND OF THE INVENTION

To meet the requirements of the Federal Motor Vehicle Safety Standards, it is necessary to conduct extensive pre-production testing of vehicle components. Particular emphasis has been placed on the impact resistance of vehicle bumpers and bumper support systems. In order to measure the impact load on a bumper as applied by a pendulum test apparatus or by a carrier crash set-up, a load cell is interposed between the bumper section to be tested and a support structure representing the bumper support system, vehicle frame or the like. The load cell has a plurality of strain gages positioned to indicate the tension and compression loads resulting from the pendulum or barrier impact.

Load cells of varying degrees of sophistication are to be found in the prior art as represented by U.S. Pat. No. 3,618,376 for a "Multi-axial Load Cell" issued Nov. 9, 1971 to E. R. Shull et al. and U.S. Pat. No. 3,520,183 for an "Apparatus for Measuring Changes in Displacement of a Body" issued July 14, 1970 to J. G. Krizik.

It is an object of the present invention to provide a relatively simple load cell that would be insensitive to bending loads and would accurately indicate off-center loading for tension or compression loads under static or dynamic conditions.

SUMMARY OF THE INVENTION

The present invention relates to a load cell for measuring of loads transmitted from an impact member to a support structure. The load cell comprises a support plate to which an impact member, e.g., a vehicle bumper, is attachable and a base plate adapted to be mounted on a support structure, e.g., a vehicle frame member. The support plate and the base plate are positioned in spaced parallel relationship to each other. Interposed between the plates are four strain bars or beams. These bars are selected from bars or beams machined to exact tolerance such that the stress versus strain curve for each is substantially identical. A positioning means secures each end of each beam to one of the plates with the longitudinal axis of each beam paralleling the plate surface and with the beams arranged to form the sides of a square. A load transfer means couples each beam to the other plate centrally of the positioning means. Strain gage means are positioned on the sides of the beams contiguous to the support and base plates in predetermined relationship to the load applying means to sense the deflection of each beam under load.

BRIEF DESCRIPTION OF THE DRAWINGS

Further features and advantages of the present invention will be made more apparent as this description proceeds, reference being had to the accompanying drawings, wherein:

FIG. 1 is a fragmentary perspective view of a vehicle bumper test set-up utilizing a load cell embodying the present invention;

FIG. 2 is a side elevation of the load cell disclosed in FIG. 1;

DESCRIPTION OF THE PREFERRED EMBODIMENTS

Figure 3:
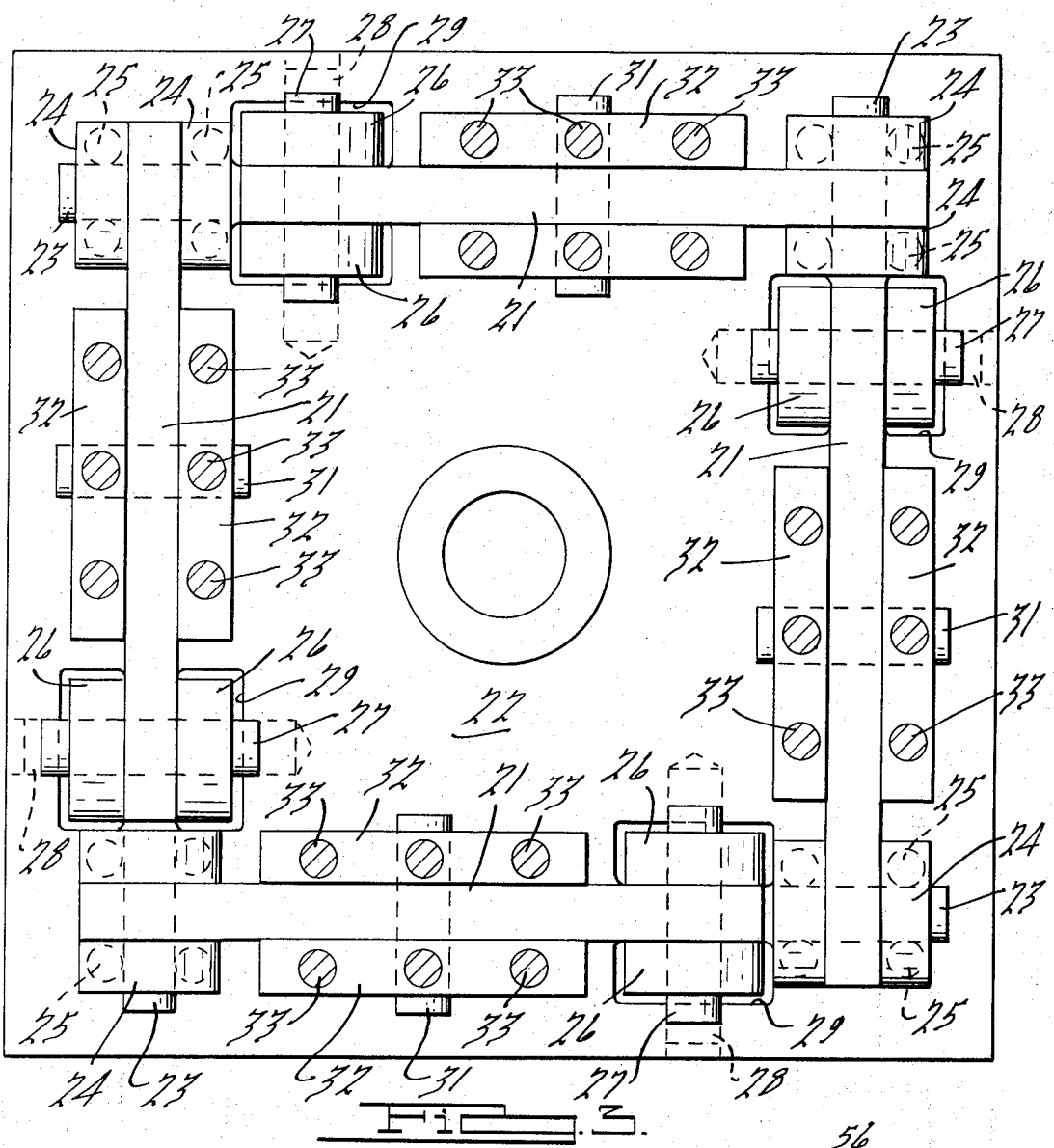
FIG. 3 is a view on the line 3—3 of FIG. 2.

Referring now to the drawings, the test set-up shown in FIG. 1 relates to vehicle bumper impact testing either with a pendulum impactor or barrier as required by the Federal Motor Vehicle Safety Standards. As shown in fragmentary perspective view, the bumper assembly, generally designated 11, comprises a metal section 12 covered with an elastomeric section 13, the elastomeric section being positioned to receive the blow of the impactor 14. The impactor 14 may be a pendulum mounted mass or a barrier mounted mass. The bumper assembly 11 normally would be mounted on an extension 15 of a vehicle frame structure or the equivalent. In order to measure the loads transmitted from the bumper to the frame structure, a load cell is interposed between the frame structure and bumper assembly.

The load cell, generally designated 16, embodying the first embodiment of the present invention is shown in FIGS. 1 to 3, inclusive. The load cell 16 comprises a support plate 17 to which the vehicle bumper assembly or impact receiving member 11 is attached by suitable hold-down or clamp devices (not shown). The load cell 16 has a base plate 18 adapted to be mounted on the vehicle frame or support structure as simulated by frame extension 15 and a mounting plate 19 mounted on the end of the frame structure.

The support plate 17 and base plate 18 are positioned in spaced parallel relationship to each other. Interposed between the spaced plates are a plurality of strain beams or bars 21. These beams or bars 21, of which there are four, are machined to exact tolerance such that the stress versus strain curve for each bar is substantially identical.

In the present embodiment the beams are positioned on the base plate with the longitudinal axis of each beam paralleling the surface 22 of the base plate and with the beams arranged in a square. The beams are spaced from the base plate surface 22. Each beam 21 is supported at one end on a pivot shaft 23 supported on upstanding base arms or posts 24 which are held on the base plate 22 by bolts 25. As viewed in FIG. 2, each beam 21 is supported at its other end on a pair of spaced straps or shackles 26 which at their upper ends carry a pivot shaft 27 projecting through the beam intermediate the straps. At their lower ends the straps are journalled on pivot shafts 28 which extend through substantially square apertures 29 in the base plate and into which the lower ends of the straps project.

The axes of the pivot shafts 23, 27 all lie in a plane substantially parallel to the plane of the base surface. Any lateral movement of each pivot shaft 27 toward the pivot shaft 23 supporting the same beam 21 will be of minor significance in disturbing this relationship.

Impact loads are applied from the support plate 17 to the beams 21 through pivot shafts 31 which project through each beam centrally of the pivot shafts 23, 27. The axis of each shaft 31 lies in the plane of the shafts 23, 27 in parallel relationship to the pair of shafts 23, 27 passing through the same beam. Each shaft 31 is coupled to or supported on the support plate by parallel upstanding arms or posts 32 of substantially triangular shape as seen in FIGS. 1 and 2. The arms or posts 32 are attached to the support plate 17 by a plurality of bolts 33.

Each beam 21 has strain gage devices positioned on the sides of the beam contiguous the support and base plates 17–18 in predetermined relationship to the load applying means to sense the deflection of the beam under load. As best seen in FIG. 2, a strain gage 34 is located on the upper side 35 of the beam 21 and a strain gage 36 is located on the lower side 37 of beam 21, both strain gages lying on a vertical center line passing through the center of shaft 31.

Figure 4:
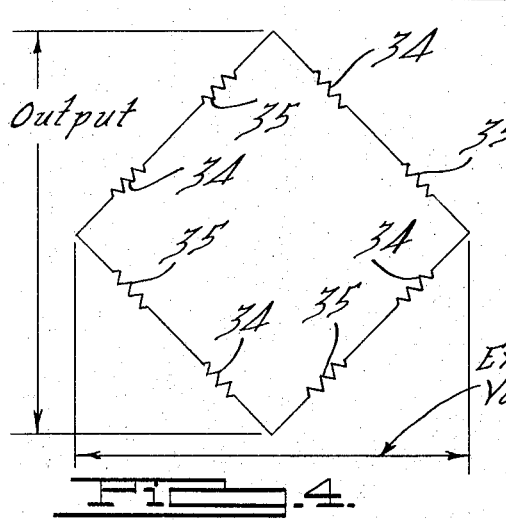
FIG. 4 is a diagrammatic view of the strain gage circuit for a load cell as disclosed.

As shown in FIG. 4, the pairs of strain gages would be arranged with the upper gage 34 and lower gage 35 on each beam as indicated in FIG. 2.

The strains are additive directly to obtain the total strain representing total load. The magnitude or contribution of strain from each bar is not necessarily the same since the precise point of impact is not necessarily in the exact center of the load cell. Therefore, either positive or negative values may be contributed by any bar or beam 21 and the net sum will represent the net load applied.

The foregoing arrangement is compatible with all modern recording equipment such as oscillographs, tapes, strain analyzers and the like.

Figure 5:
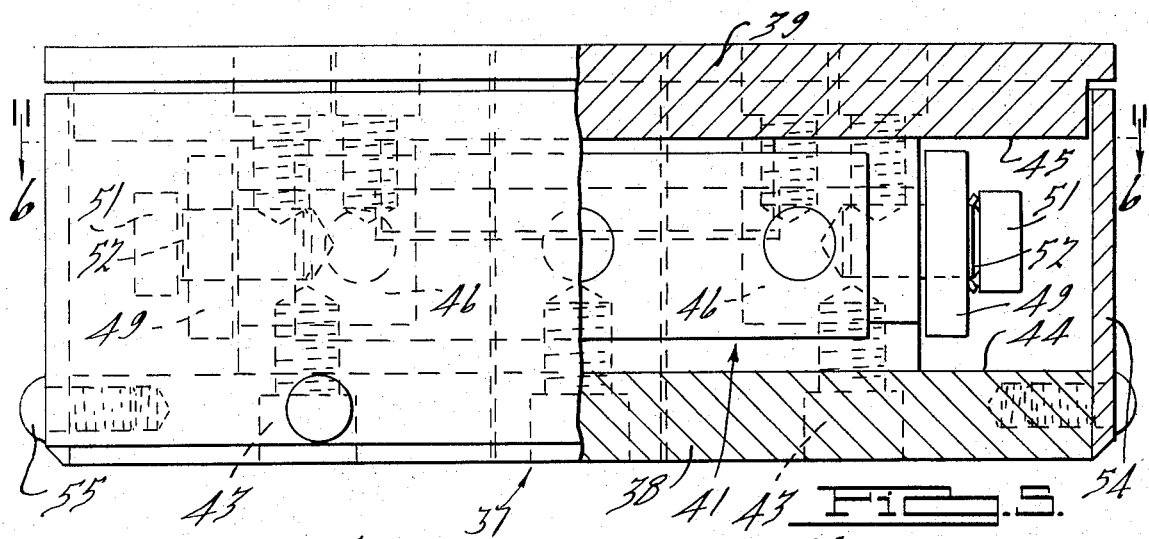
FIG. 5 is a side elevational view of a second embodiment of the present invention.
Figure 6:
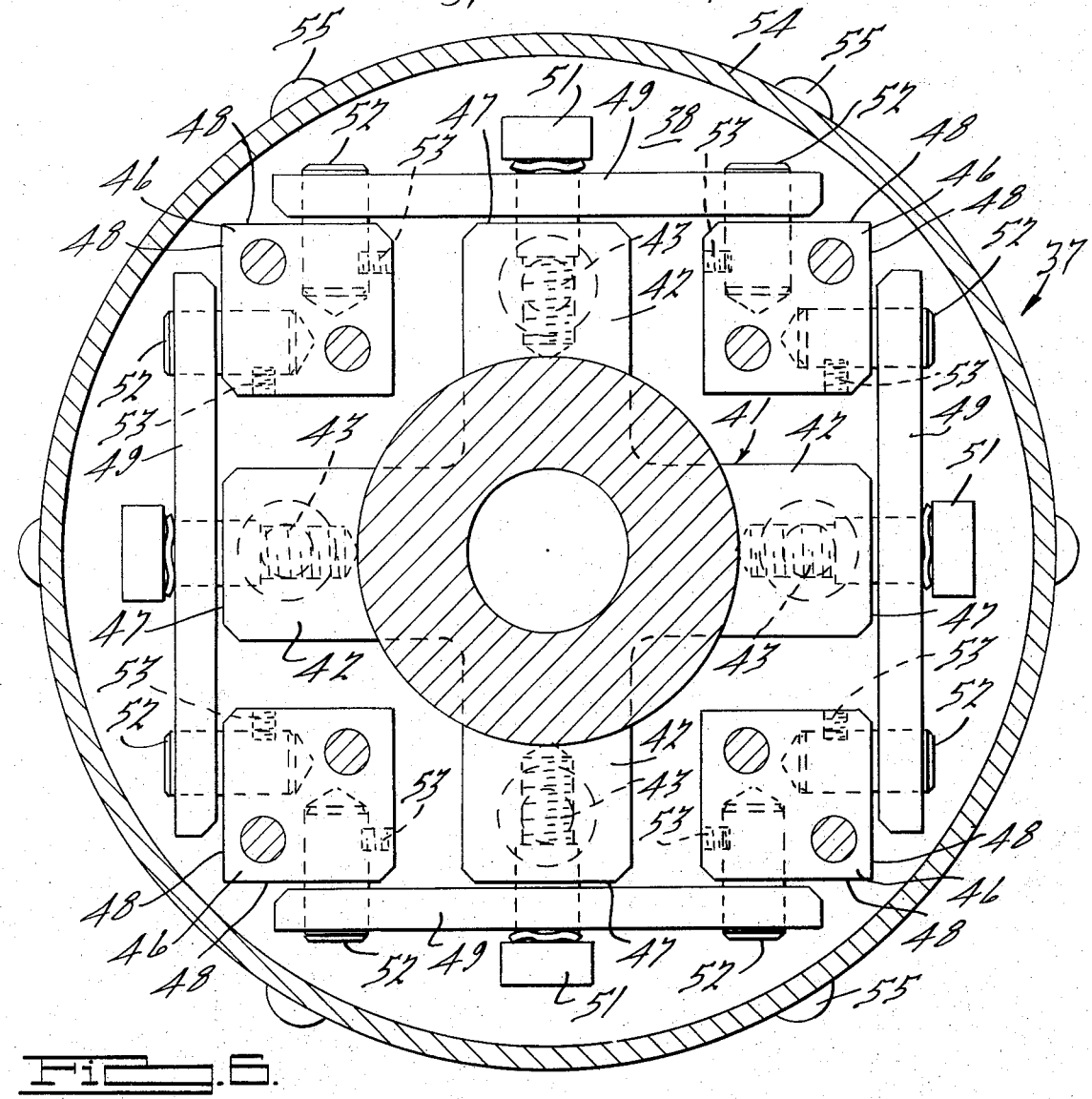
FIG. 6 is a view on the line 6—6 of FIG. 5.

The load cell, generally designated 37, disclosed in FIGS. 5 and 6 is functionally similar to the embodiment of FIGS. 1 to 3, inclusive. It has a different shape to some of its parts and a reversal of the beam support members.

In this embodiment, the base plate 38 and the support plate 39 are circular as viewed in FIG. 6. Secured to the base plate 38 is a spider 41 having four legs 42 projecting outwardly at right angles to each other. The spider 41 is shown bolted by bolts 43 to the upper surface 44 of the base plate 38.

Bolted to the lower surface 45 of the support plate 39 are four square pivot posts 46 located to form the corners of a square. The posts 46 extend toward the upper surface 44 of the base plate 38 but terminate some distance above the latter. The end face 47 of each spider leg 42 lies in the same plane as the side faces 48 of the adjacent pivot posts (see FIG. 6).

Supported in parallel relationship to the parallel faces 47-48 are four strain bars or beams 49. The beams 49 are centrally supported on shoulder studs 51 which are threaded into the end faces 47 of the spider legs 42. Each beam end is supported on a short shaft 52 held within the pivot post 46 by a set-screw 53, although it will be understood that shoulder studs also could be used. The shoulder studs 51 are accurately centrally located between the support shafts 52.

The load cell is provided with a cylindrical cover 54 held in place by suitable bolts 55 threaded into the base plate 38.

In this embodiment loads applied to the support plate 39 are transferred to the ends of the beams 49 through the shafts 52 causing the beams to deflect about the centrally located shoulder studs 51.

Figure 7:
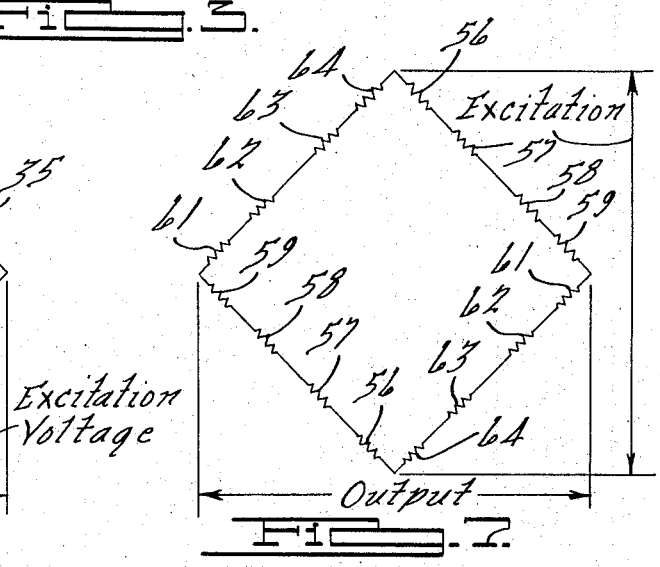
FIG. 7 is a diagrammatic view of a more sophisticated strain gage circuit.

The deflection of the beams 49 are measured by strain gages which may be arranged in a pattern as indicated in the bridge circuit in FIG. 7. The gages comprise matched pairs located on the top and bottom of each beam 49. The matched pairs are indicated by like reference numerals. For example, the first beam (starting with any one) would have a matched pair of strain gages 56 on the top of the bar and a matched pair 61 on the bottom; the next beam would have pair 57 on top and pair 62 on the bottom; the next one would have top pair 58 and bottom pair 63 and the fourth bar would have top pair 59 and bottom pair 64.

To summarize, the square load cell 16 of the embodiment of FIGS. 1 to 3 and the circular load cell 37 of the embodiment of FIGS. 5 and 6 each operates on the principle of a beam simply supported at each end and loaded at the midpoint (halfway between the end supports). The strain gages are located at the midpoint of the beam to measure the bending strain which is directly proportional to the load being applied. This is the point where maximum strain occurs.

The four (4) bar or beam arrangement embodied in the present invention provides a very stable system and lends itself to a balanced bridge condition where all strain gages are active. To obtain absolute free simple bending, some form of free movement parallel to the bar must be provided at one end of the bar so there is no restriction to the simple bending. In the case of the embodiment of FIGS. 1 to 3, the arms or shackles 26 provide this free motion. In the second embodiment, the bars or beams 51 each are provided with a slotted hole at one end receiving a pin 52. The elongation of the hole is on the order of a few thousandths of an inch and would not be visible in the scale of the drawings.

It is to be understood that the invention is not limited to the exact construction illustrated and described above, but that various changes and modifications may be made without departing from the spirit and scope of the invention as defined by the following claims:

I claim:

1. A load cell for measurement of loads transmitted from an impact receiving member to a support structure, the load cell comprising:

a support plate to which the impact receiving member is attachable and a base plate adapted to be mounted on the support structure, the support plate and base plate being positioned in spaced parallel relationship to each other, four strain beams having substantially identical stress versus strain curves interposed between the spaced support and base plates, positioning means securing each end of the beams to one of the plates with the longitudinal axis of each beam paralleling the plate surface and with the beams arranged to form the sides of a square, load transfer means coupling each beam to the other plate centrally of the positioning means, and strain gage means positioned on the sides of the beams contiguous the support and base plates in predetermined relationship to the load transfer means to sense the deflection of each beam under load.

2. A load cell according to claim 1, in which:

the positioning means for each beam comprises at each end of the beam a pivot shaft supported on an end pivot support member extending from the one plate toward the other, the axes of the pivot shafts lying in a plane substantially paralleling the plane of the one plate surface.

3. A load cell according to claim 2, in which:
the load transfer means for each beam comprises:
a pivot shaft projecting through each beam centrally of the pivot shafts at each end of the beam and having its axis parallel to and in the same plane as the axes of the end pivot shafts,
and support means positioning and retaining each central pivot shaft on the other plate.

4. A load cell according to claim 3, in which:
the base plate and the support plate are of substantially uniform shape,
and both plates have provisions for attachment to the respective support structure and impact receiving member.

5. A load cell according to claim 2, in which:
the end pivot support members are attached to the base plate and extend toward the support plate.

6. A load cell according to claim 5, in which:
the end pivot support member at one end of each beam is fixedly attached to the base plate, and
the end pivot support member at the other end of each beam is pivotally attached to the base plate.

7. A load cell according to claim 6, in which:
the load transfer means for each beam comprises a pivot shaft projecting through each beam centrally of the pivot shafts at each end of the beam and having its axis parallel to and in the same plane as the axes of the end pivot shafts,
and support means positioning and retaining each central pivot shaft a distance from the surface of the support plate.

8. A load cell according to claim 7, in which:
the support means comprises arms fixed to the support plate and projecting toward the base plate.

9. A load cell according to claim 2, in which:
the end pivot support members comprise posts attached to the support plate which project toward the base plate.

10. A load cell according to claim 9, in which:
the load transfer means for each beam comprises a pivot shaft projecting through each beam centrally of the pivot shafts at each end of the beam and having its axis parallel to and in the same plane as the axes of the end pivot shafts,
and support means positioning and retaining each central pivot shaft in spaced relationship to the surface of the base plate.

11. A load cell according to claim 10, in which:
the support means comprises a four legged spider attached to the base plate,
the central pivot shafts projecting from the end face of each leg of the spider.

12. A load cell for measurement of loads transmitted from a vehicle bumper to a vehicle frame member supporting the bumper,
the load cell comprising:
a support plate to which the vehicle bumper is attached and a base plate mounted on an end of the vehicle frame member,
the support plate and base plate being positioned in spaced parallel relationship to each other,
four strain beams having substantially identical stress versus strain curves interposed between the spaced support and base plates,
positioning means securing each end of the beams to one of the plates with the longitudinal axis of each beam paralleling the plate surface and with the beams arranged to form the sides of a square,
load transfer means coupling each beam to the other plate centrally of the positioning means,
and strain gage means positioned on the side of the beams contiguous the support and base plates in predetermined relationship to the load transfer means to sense the deflection of each beam under load.

* * * * *